United States Patent [19]

Shibasaki et al.

[11] Patent Number: 4,956,159

[45] Date of Patent: Sep. 11, 1990

[54] PROCESS FOR RECOVERING GALLIUM TRICHLORIDE FROM GALLIUM-CONTAINING WASTE

[75] Inventors: Takeyoshi Shibasaki, Kagawa; Etsuji Kimura, Kasukabe; Yutaka Nishiyama, Yono, all of Japan

[73] Assignee: Mitsubishi Kinzoku Kabushiki Kaisha, Japan

[21] Appl. No.: 394,275

[22] Filed: Aug. 15, 1989

Related U.S. Application Data

[63] Continuation of Ser. No. 131,117, Dec. 10, 1987, abandoned.

[30] Foreign Application Priority Data

Dec. 12, 1986 [JP] Japan .................................. 61-294914

[51] Int. Cl.$^5$ ............................................. C01G 15/00
[52] U.S. Cl. ................................. 423/135; 423/112; 423/136; 423/495; 423/624
[58] Field of Search ............... 423/495, 135, 136, 112, 423/624

[56] References Cited

U.S. PATENT DOCUMENTS

| | | | |
|---|---|---|---|
| 2,823,096 | 2/1958 | Frevel | 423/135 |
| 4,362,560 | 12/1982 | Abrjutin et al. | 75/63 |
| 4,666,575 | 5/1987 | Kubo | 423/136 |

FOREIGN PATENT DOCUMENTS

| | | | |
|---|---|---|---|
| 1094328 | 1/1981 | Canada | 423/136 |
| 56-38661 | 9/1981 | Japan . | |
| 57-101625 | 6/1982 | Japan . | |
| 62-153120 | 7/1987 | Japan . | |

*Primary Examiner*—Theodore Morris
*Assistant Examiner*—Paige C. Harvey
*Attorney, Agent, or Firm*—Webb, Burden, Ziesenheim, & Webb

[57] ABSTRACT

Gallium-containing waste is chlorinated in the presence of gallium trichloride from the beginning. By this procedure, gallium is more efficiently chlorinated and gallium trichloride is more easily separated from other chlorides and recovered.

4 Claims, No Drawings

PROCESS FOR RECOVERING GALLIUM TRICHLORIDE FROM GALLIUM-CONTAINING WASTE

This is a continuation of copending application Ser. No. 131,117 filed Dec. 10, 1987, now abandoned.

FIELD OF THE INVENTION

This invention relates to a process for recovering gallium trichloride from gallium-containing waste, such as scrap produced in the production of gallium-arsenic compounds, gallium-phosphorus compounds, etc., which are widely used as semiconductor materials in electronic engineering, and other gallium-containing materials.

BACKGROUND OF THE INVENTION

Nowadays, compound semiconductors such as gallium-arsenic compounds, gallium-phosphorus compounds, etc. are widely used for various purposes, and the demand therefor is rapidly increasing. Semiconductor chips of GaAs, GaP, etc. are prepared by forming monocrystals of GaAs, GaP, etc. by a drawing-up method, slicing the formed monocrystal rod into wafers, and cutting the wafers into chips of several millimeters square. In these procedures, a large amount of scrap is produced during the several steps of slicing and cutting. Also, when monocrystals are prepared, irregularly shaped portions formed at the start of the drawing-up are discarded, and a considerable amount of polycrstalline materials remain at the bottom of the crucibles used for melting. All these from gallium-containing waste.

Gallium is a rare element having no specific ores. Therefore, it is essential to recover gallium from the above-mentioned waste and reuse it. Various methods for recovering gallium have been known.

Japanese Patent Publication No. 56-386641B(1981) discloses a process, which comprises dissolving waste containing gallium and arsenic in an acid medium in the presence of an oxidizing reagent, adjusting the pH of the solution to 2-8 to let hydroxides of gallium and arsenic precipitate, collecting the precipitate by filtration, dissolving the precipitate in an alkaline solution as sodium gallate, and finally recovering gallium electrolytically.

Another example is a process of Canadian Patent No. 1094328, which comprises dissolving waste containing gallium and arsenic in an acid, removing the residue by filtration, raising the pH of the solution to 11 or higher with NaOH, precipitating arsenic as calcium arsenate by addition of CaO or Ca(OH)$_2$, separating the precipitate by filtration and electrolytically recovering gallium.

The above-mentioned wet processes generally comprise dissolving gallium-containing waste in an acid or alkaline aqueous medium, separating unwanted and wanted materials as a precipitate and a filtrate and finally recovering gallium electrolytically from the filtrate. However, the gallium recovered by the above processes is not satisfactory in purity as semiconductor material and requires a further purification. Also, wet processes generally consume much time and energy.

Another example is a process of Japanese Patent Publication 57-101625A(1982), wherein gallium-containing waste is subjected to vacuum distillation at a high temperature of 1100°-1150° C., the sublimed arsenic is recovered by condensation, and the molten gallium is cooled, dissolved in an acid and recovered by recrystallization in a purified state. This process requires high-temperature distallation which consumes a lot of energy and is not satisfactory in that when chromium is present in the waste, high quality gallium cannot be recovered because separation of chromium and gallium is difficult by this process.

Rather recently, a chlorination process has been proposed in chlorine, arsenic chloride is separated by distillation and gallium chloride is recovered (U.S. Pat. No. 4,666,575). This chlorination process is advantageous in that gallium of higher purity can be recovered more easily than by previously known processes. However, this chlorination process is not applicable to gallium waste containing no arsenic, since this chlorination process is characterized by performing chlorination of gallium perventing precipitation of gallium dichloride, which causes blocking of the chlorine-blowing lance, in the presence of arsenic chloride. Therefore, when gallium waste containing no arsenic is treated, metallic arsenic or arsenic chloride must be added. The chlorination must be performed at a temperature lower than the boiling point of arsenic chloride (Ca. 130° ), preferably under 70° C., until substantially all of the gallium in the waste is chlorinated inspite that the arsenic chloride has finally to be distilled off.

We attempt improvement of the above-mentioned chlorination process and have found that chlorination of gallium-containing waste effectively proceeds if the chlorination thereof is carried out in the presence of gallium trichloride from the beginning, chlorination can be performed at a higher temperature, and chlorination and distillation of arsenic chloride and other low-boiling-point chlorides can be simultaneously conducted.

SUMMARY OF THE INVENTION

This invention provides in a process of recovering gallium trichloride from gallium-containing waste comprising chlorinating gallium-containing waste, separating gallium trichloride from the chlorination product by fractional distillation, an improvement comprising carrying out chlorination in the presence of gallium trichloride from the beginning as removing the produced low-boiling-point chlorides of elements contained in the gallium-containing waste.

Gallium-containing waste to be treated with the process of the present invention includes scrap produced in the production of semiconductor materials such as gallium-arsenic compounds, gallium-phosphorus compounds, etc. and other scrap containing metallic gallium. Such gallium waste is preferably used in the crushed state for better contact with chlorine gas.

The gallium trichloride used in the process of this invention may be the one recycled from a previous run.

Gallium waste can be introduced into a hot gallium trichloride bath prepared beforehand, or a mixture of gallium trichloride and gallium-containing waste can be heated.

The chlorination reaction is represented by the following chemical equations:

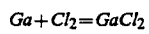

$Ga + Cl_2 = GaCl_2$

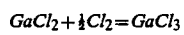

$GaCl_2 + \tfrac{1}{2}Cl_2 = GaCl_3$

$As + 3/2Cl_2 = AsCl_3$ $$P + 3/2Cl_2 = PCl_3$$

$$PCl_3 + Cl_2 = PCl_5$$

$$M + x/2Cl = MCl_x$$

wherein M is another metal constituting the gallium-containing waste and x is the valency of the metal.

As shown in the above reaction equations, Ga gives $GaCl_2$ and $GaCl_3$. The boiling point of $GaCl_2$ is about 535° C., and that of $GaCl_3$ is about 201° C.

As the chlorination proceeds, the bath becomes a mixture of the initially added gallium trichloride and chlorides of gallium and other metals which constituted the gallium-containing waste. The boiling points of $AsCl_3$ and $PCl_3$ are about 130° C. and about 75° C., which are remarkably lower than the boiling point of $GaCl_2$ (Ca. 535° C.) and $CaCl_3$ (Ca. 201° C.). Therefore, chlorination of gallium and distillation of low-boiling chlorides can be simultaneously carried out by maintaining the chlorination bath at a temperature of from 130° to 200° C. By this simultaneous chlorination and distillation, the processing time is shortened, efficiency of chlorination is improved because the chlorination is carried out at higher temperatures than the previously known chlorination process. Also, low-boiling chlorides are removed from the chlorination bath as they are formed and therefore, an increased amount of gallium-containing waste can be treated in a chlorination vessel of the same capacity.

In consideration of ease and energy consumption in the distillation of gallium chloride that comes after the chlorination, the high-boiling point $GaCl_2$ should preferably be converted to $GaCl_3$ as much as possible by supplying an excess of chlorine. The equivalent amount of chlorine required for chlorinating 1kg of GaAs to $GaCl_2$ and $AsCl_3$ is 387 liters (under normal conditions), which is called 1 equivalent amount in this specification. When 1.0-1.2 equivalents of chlorine is used, mainly $GaCl_2$ produced, and when 1.2-2.0 equivalents of chlorine is used, mainly $GaCl_3$ is produced. One equivalent amount required for chlorinating GaP to $GaCl_2 + PCl_3$ is 556 liters.

The rate of chlorine supply is not specifically limited, and it is suitably selected by considering reaction efficiency, reaction time, and so forth.

Arsenic chloride, phosphorus chloride and other low-boiling chlorides are first separated by distillation simultaneously with chlorination.

When the melt is sufficiently chlorinated, the remaining bath mainly comprises $GaCl_3$ and includes high-boiling-point chlorides derived from impurities in the waste such as $AlCl_3$, $InCl_3$, $CrCl_3$, etc. The $GaCl_3$, is separated by distillation. The thus collected crude $GaCl_3$ can be further purified by rectification, and then converted to metallic gallium by any known process, reduction by aluminum or zinc powder, or hydrogen. Or, the crude $GaCl_3$ can be treated by a wet process in which finally the gallium is electrolytically recovered. All these are known processes.

In the case of electrowinning of gallium, either an acid solution or an alkaline solution may be employed. When an acid solution is used, the gallium chloride should be purified beforehand in order to prevent simultaneous deposition of impurities and generation of $AsH_3$. When an alkaline solution is used, the gallium chloride is neutralized and the formed precipitate of gallium hydroxide is separated by filtration and dissolved again in an alkaline solution as sodium gallate and the solution is subjected to electrolysis. Impurities such as iron, arsenic, etc. are separated as insoluble hydroxides.

The dry process chlorination of gallium-containing waste proceeds far faster than the wet treatment thereof. The process of the present invention can be applied to gallium waste containing no arsenic such as GaP scrap and metallic gallium scrap. Chlorination can be affected at a higher temperature at which there is no trouble of precipitation of gallium dichloride, and chlorination of gallium and removal of low-boiling point chlorides derived from the non-gallium contents of gallium-containing waste are simultaneously carried out. Therefore, a chlorination vessel of limited capacity can be efficiently utilized. This is significant advantage in a commercial scale operation. In the process of the present invention, $AsCl_3$, $PCl_3$, etc. can be also easily purified.

SPECIFIC DESCRIPTION OF THE INVENTION

The invention will now be illustrated by way of working examples.

EXAMPLE 1

Five hundred grams (500 g) of $GaCl_3$ and 500 g of GaAs semiconductor scrap were placed in a 2 liter 4-necked flask. A stirrer was attached to one neck and a thermometer was attached to the second neck. The third neck was provided with a distillation tube 500 mm in length and 20 mm in inner diameter and a cooler was connected to the top of the distillation tube to collect the low-boiling chlorides. The contents were heated to 150° C. by a mantle heater. Chlorine gas blown through the melt through the fourth neck at a rate of 500 ml/min under stirring. The reaction is exothermic and the temperature of the melt was raised to 180° C. and further chlorine gas blown in. The excess chlorine gas coming out of the disllation tube was absorbed in a sodium hydroxide solution.

The low-boiling $AsCl_3$ was distilled off through the distillation tube and the cooler. Further continuously chlorine gas was blown in for 9 hours (1.42 equivalents in total) and 548 g of 99.8% pure $AsCl_3$ was obtained. The residue in the flask weighed 1327 g and contained 90.6% of $GaCl_3$. The products were analyzed by ICAP.

Seventy-five grams (75 g) of the flask residue was taken into a beaker and water was added thereto to make 300 ml. The resulting solution was neutralized with NaOH and gallium hydroxide was precipitated. The precipitate was collected by filtration, and 30 g of NaOH and water were added thereto to make 200 ml of a solution of sodium gallate. From this solution, chromium, indium, etc., were precipitated and the precipitates were removed. The gallium concentration in the remaining solution was about 150 g/liter. The solution was electrolyzed with 10A current for 4 hours. The metallic gallium thus formed weighed 25 g after washing with diluted HCl and $HNO_3$. Its purity was 99.999%.

EXAMPLE 2

Five hundred grams (500 g) of $GaCl_3$ was placed in the same 2 liter 4-necked flask as used in Example 1, and then 500 g of GaP scrap was added thereto. The contents were heated to 170° C. to be melted. Then chlorine was blown into the melt at a rate of 200 ml/min. The chlorination reactions of gallium and phosphorus are exothermic. The temperature of the melt was maintained at 170°-190° C. The formed and vaporized $PCl_3$ and $PCl_5$ were trapped by the cooler and collected. After 500 liters (1.86 equivalents) of chlorine was blown through the melt, the remaining reaction mixture was collected.

The mixture weighed 1468 g, and was found to comprise 538 g of Ga, 15 g of P and 594 g of Cl. The product collected by the cooler weighed 854 g and comprised 3 g of Ga, 132 g of P and 685 g of Cl.

One (1) kg of the flask resuidue was dissolved in water, and the solution was neutralized and filtered and thus gallium hydroxide was collected and 359 g of 99.996% pure gallium was electrolytically obtained.

COMPARATIVE EXAMPLE 1

Five hundred (500) g of $AsCl_3$ was placed in the same 2 liter 4-necked flask as used in Example 1, and then 500 g of GaAs scrap was added thereto. The contents were warmed to 60° C. and chlorine gas was blown in at a rate of 400 ml/min and the excess chlorine coming out of the distillation tube was absorbed in a sodium hydroxide solution. The chlorination reaction is exothermic and the temperature of the melt rose to 70°-90° C. Partly vaporized $AsCl_3$ was trapped by the distillation tube and returned to the melt. After 348 liters of chlorine (1.8 equivalents) was blown through, the mixture remaining in the flask was collected, which weighed 1736 g. The analysis by ICP revealed that the melt comrised 600 g of $GaCl_3$ and 1122 g of $AsCl_3$.

In Example 1, the volume of the flask residue when the chlorination was finished was 570 ml, while in this Comparative Example 1 the corresponding volume was 760 ml. This means that in the process of U.S. Pat. No. 4,666,575 a larger reaction vessel is reqired for treating the same amount of gallium waste than in the process of the present invention.

In Example 1, 9 hours were required for chlorination and distillation with the chlorine supply at the rate of 500 ml/min. In Comparative Example 1, however, additional about 5 hours were required for dillation of $AsCl_3$ after about 14.5 hours' chlorination with the chlorine supply at the rate of 400 ml/min.

COMPARATIVE EXAMPLE 2

Five hundred grams (500 g) of GaAs scrap was placed in the same 2 liter 4-necked flask as used in Example 1, and the flask was warmed to 60° C. Then chlorine gas was blown into the flask at a rate of 400 ml/min. The analysis of the sodium hydroxide solution which absorbed the unreacted chlorine revealed that 90% of the supplied chlorine left the flask and absorbed in the solution in the initial stage before substantial amount of $GaCl_3$ was formed. That is, the conversion of chlorine was only 10%.

In contrast, in Example 1 the amount of chlorine absorbed in the sodium hydroxide solution was no more than 10% even in the initial stage of chlorine supply.

We claim:

1. In a process of recovering gallium tichloride from gallium-containing waste comprising chlorination gallium-containing waste to form a chlorination product including elements of low-boiling-point chlorides contained in the gallium-containing waste, separating and collecting gallium trichloride from the chlorination product by fractional distillation, the improvement comprising carrying out said chlorination of gallium waste initially in the presence of gallium tichloride and simultaneously removing the produced low-boiling-point chlorides of elements contained in the gallium-containing waste.

2. The process as set forth in claim 1, wherein the chlorination is carried out at a temperature of from 130° to 200° C.

3. The process as set forth in claim 1, wherein the recovered gallium trichloride is purified by rectification.

4. The process as set forth in claim 1, wherein the gallium-containing waste is GaAs waste or GaP waste.

* * * * *